United States Patent [19]
Davis et al.

[11] Patent Number: 4,721,849
[45] Date of Patent: Jan. 26, 1988

[54] PORTABLE PROGRAMMABLE OPTICAL CODE READER

[75] Inventors: Paul R. Davis; Michael J. Brorby, both of Corvallis, Oreg.

[73] Assignee: Videx, Inc., Corvallis, Oreg.

[21] Appl. No.: 782,970

[22] Filed: Oct. 2, 1985

[51] Int. Cl.$^4$ .............................................. G06K 7/10
[52] U.S. Cl. ..................................... 235/472; 235/455
[58] Field of Search ................ 235/380, 383, 472, 455

[56] References Cited

U.S. PATENT DOCUMENTS

| | | |
|---|---|---|
| 3,417,234 | 12/1968 | Sundblad . |
| 3,826,900 | 7/1974 | Moellering . |
| 3,868,514 | 2/1975 | Israelsson . |
| 4,091,270 | 5/1978 | Musch . |
| 4,101,072 | 7/1978 | Weaver ................................ 235/455 |
| 4,143,809 | 3/1979 | Uebbing . |
| 4,179,064 | 12/1979 | Yoshioka et al. . |
| 4,434,360 | 2/1984 | Woosley et al. . |
| 4,443,694 | 4/1984 | Sanford . |
| 4,454,414 | 6/1984 | Benton ................................ 235/383 |
| 4,471,218 | 9/1984 | Culp . |
| 4,621,189 | 11/1986 | Kumar et al. . |
| 4,628,193 | 12/1986 | Blum .................................. 235/472 |

OTHER PUBLICATIONS

Weaver, Micro-Wand TM: A Pocket-Sized Computer that reads Bar Code, *Bar Code News*, May/Jun. 1984 pp. 22-28.

Primary Examiner—Harold I. Pitts
Attorney, Agent, or Firm—Chernoff, Vilhauer, McClung & Stenzel

[57] ABSTRACT

A portable sensing device for reading data codes comprising a thin, generally planar housing of polygonal shape having a light source and light sensor at one of the corners thereof for reading data codes. The code reader contains a memory not only capable of storing the sensed data codes for future access, but capable of being programmed. A multipurpose battery charger is provided which is capable of charging multiple ones of the code readers simultaneously while receiving outputs from their memories and inputting commands or programming. Although the output from each code reader is performed optically through coded pulsing of the light source, the input occurs through the battery charger terminals, the charging current being delivered in coded pulses. Outputs from multiple code readers placed in a single charger occur sequentially in accordance with coded commands given by the charger.

19 Claims, 6 Drawing Figures

FIG. 6  CODE READER / CHARGER INTERFACE FUNCTIONS

FIG. 6 (CONTINUED)

PORTABLE PROGRAMMABLE OPTICAL CODE READER

BACKGROUND OF THE INVENTION

This invention relates to optical sensing devices for reading bar codes and other data codes, and particularly such devices of the portable type having a memory for storing codes read by the device for subsequent entry in a host computer.

Optical code readers are used in a wide variety of applications involving tabulation and identification, such as supermarket checkouts, inventory control, security, etc. Some of these code readers are self-contained and portable, having their own battery power source, memory and clock, and having an accompanying multi-purpose battery charger which also acts as the reader's output interface with a host computer, as shown, for example, in U.S. Pat. No. 4,471,218. The output is accomplished by coded pulsing of the light source of the device, which is sensed by a light sensor in the charger receptacle. The code reader is also capable of receiving commands through its optical sensor. A somewhat similar portable code reader has been marketed by Hand Held Products Inc. under the trademark Micro-Wand.

Typical optical code readers of the portable type are of an elongate configuration of a relatively large diameter, such as the Micro-Wand reader or that shown in the above-mentioned U.S. Pat. No. 4,471,218. Similar portable configurations are shown in U.S. Pat. Nos. 3,826,900, 4,091,270 and 4,179,064. Such devices are inconvenient to carry in a pocket and are too bulky to be carried in a wallet or checkbook, as can a pocket calculator or a credit card. The inconveniently large diametric thickness of such devices is largely dictated by the space requirements of their optical reader heads which are normally of the focusing type as shown, for example, in U.S. Pat. Nos. 3,417,234, 3,868,514, 4,143,809 and 4,443,694. Although the thinnest types of optical reader heads are of the contact type whereby a fiber optic filament connected to a light sensor may be placed in direct contact with a data code, as shown, for example, in U.S. Pat. No. 4,434,360, the beneficial effect which such a head construction can have on the miniaturization and portability of the overall reader device has apparently not previously been recognized.

The outputs from the memories of such devices have not previously been obtainable in a particularly efficient or reliable manner, despite the aforementioned provision of output interfaces in the battery chargers for the devices. One drawback is that no means is available for placing a group of individual code readers simultaneously into a single charger which then will receive their respective outputs automatically and transmit them to a host computer without the need for personal supervision of the process. Another problem is that, although commands can be given to the code reader optically in the receptacle as suggested by the aforementioned U.S. Pat. No. 4,471,218, the need for exact alignment of the code reader with the receptacle's light source to receive commands optically can create a reliability problem, and make it impossible for the reader to receive and transmit simultaneously. Accordingly, the inability of the reader to receive commands reliably while in the receptacle, or to sense whether or not it is properly positioned in a receptacle, contributes further to the need for supervision and also to the likelihood of malfunction of the output process.

SUMMARY OF THE PRESENT INVENTION

The present invention solves the foregoing drawbacks of prior optical code readers by providing a portable optical sensing device in a thin, generally planar housing, preferably of polygonal shape similar to a pocket calculator or credit card and equally easy to carry. To eliminate the difficulties to be expected in trying to physically position a device of this shape in proper proximity to data codes which may not be easily accessible or may be surrounded by other physical structure tending to interfere with the placement of anything other than a relatively pointed sensor in close proximity with the codes, the housing of the present invention contains a light source and light sensor located along an edge of the housing and facing generally parallel to the plane of the housing. Preferably the light source and light sensor are located at a corner of the housing facing obliquely to the edges which join at the corner. The thinness of the planar housing of the code reader is made possible in part by the use of a contact-type light sensor assembly utilizing one or more fiber-optical filaments projecting from the edge of the housing so as to physically contact the data codes.

The ability to record the outputs from the memories of a group of portable code readers in a convenient, efficient fashion without the need for supervision is provided by a battery charger assembly having multiple data transmission receptacles into which a group of optical code readers can be placed simultaneously. The receptacles not only have means for receiving the output of each device and charging the batteries thereof, but also for giving commands and programming the code reader if necessary. The reliability of the command and programming inputs are assured by the fact that these information inputs are transmitted, not optically whereby slight misalignment of the device with the receptacle could cause malfunction, but rather electrically through a separate input system Preferably, to optimize the simplicity of the structure, commands and programming are transmitted through coded pulsing of the battery charger current. This provides reliability and cost saving, by eliminating the need for an input port separate from the charging terminals.

The fact that the code reader device is arranged to accept an input, as well as provide an output, in the same charger receptacle enables the device to be automatically responsive to placement in the receptacle in controlling access to its memory, enables a group of code reader devices to be placed simultaneously in a charger and receive coded commands enabling them to deliver their outputs or receive inputs automatically in sequence without supervision, eliminates any need for movement of the devices between different receptacles for output and input functions respectively, and permits simultaneous output, input and charging functions if desired.

The programmability of the code reader provides extreme versatility with respect to the variation of codes to be recognized, variation of the recognizable order or hierarchy of the codes, changing of time relationships or time resolution with respect to code sensing events, changing of security procedures, changing of output formats, changing of data retention procedures, etc.

Accordingly, it is an object of the present invention to provide an optical code reader of a thin, planar, more portable configuration than has previously been available without detracting from the ability of such device to read data codes in relatively inaccessible locations.

It is a further object of the present invention to provide a portable optical code reader with an electrical data input system separate from its optical input system.

It is a further object of the invention to provide a single interface, between the code reader and a host computer, having separate data-receiving and data-transmitting capabilities for interacting separately with both the output and input systems, respectively, of the code reader.

It is another object of the invention that the data-transmitting features of the aforementioned interface be integrated with battery-charging features thereof for simplicity and reliability.

It is a further object of the invention to provide an assembly for more efficiently and reliably receiving the output from the memory of a portable optical code reader, or from a group of such code readers, in an automatic fashion without the need for supervision.

It is another object of the present invention to provide a portable optical code reader which is programmable and reprogrammable by electrical input means to maximize its versatility.

The foregoing and other objectives, features and advantages of the invention will be more readily understood upon consideration of the following detailed description of the invention, taken in conjunction with the accompanying drawings.

DESCRIPTION OF THE PREFERRED EMBODIMENT

Portable Configuration

Figure 1:
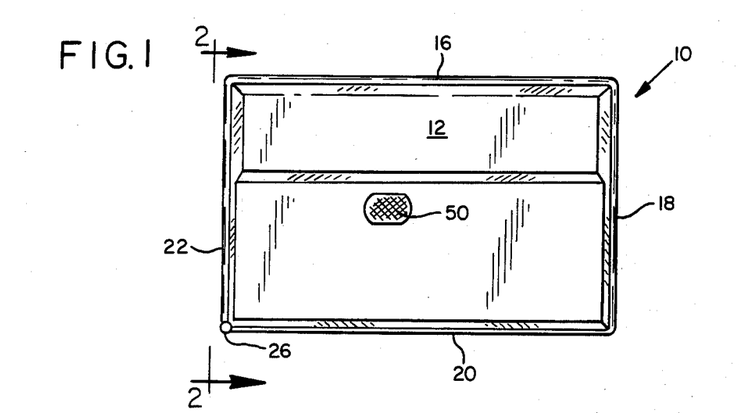
FIG. 1 is an exterior top view of an exemplary embodiment of the portable portion of the optical code reader of the present invention.
Figure 2:
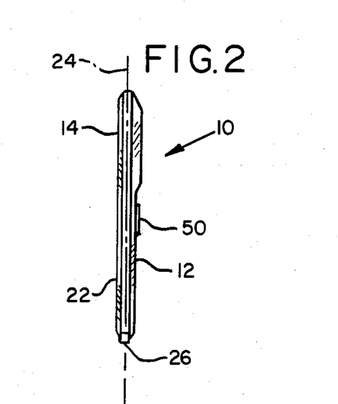
FIG. 2 is an edge view taken along line 2—2 of FIG. 1.
Figures 3, 5:
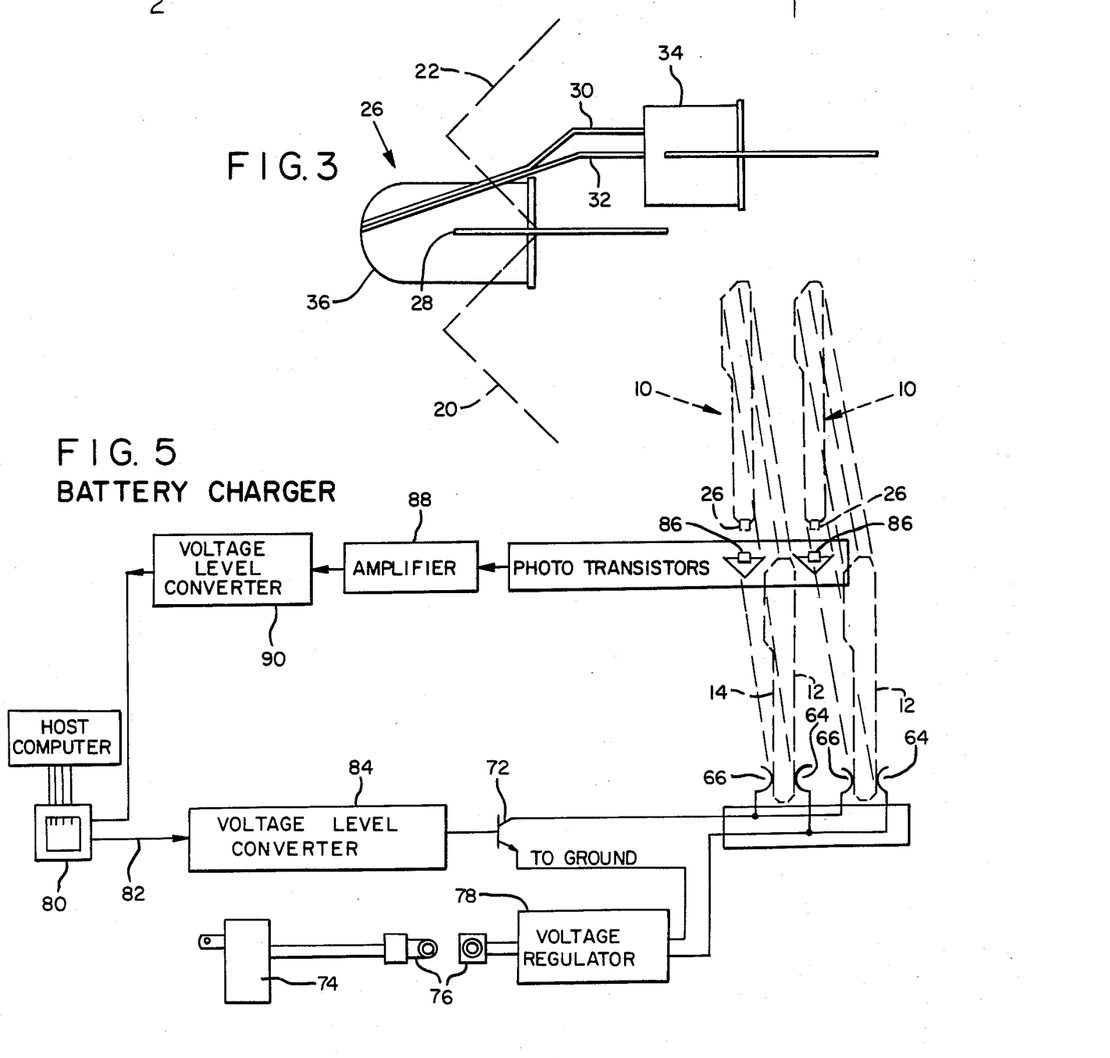
FIG. 3 is an enlarged top view of the optical reader head assembly of the optical code reader, showing the light source and light sensor.
FIG. 5 is a simplified schematic diagram of the major components of the battery-charging unit.

FIGS. 1 and 2 illustrate a configuration of the portable portion of the optical code reader of the present invention which is designed to increase its portability without hindering its optical code-reading function. The portable unit, designated generally as 10, comprises a thin, generally planar housing consisting of upper and lower electrically-conductive plates 12 and 14 separated by multiple elongate edges 16, 18, 20 and 22 of dielectric material so as to electrically insulate the plates 14 and 12 from each other. The edges are joined at corners of the housing and extend longitudinally in multiple directions in the same imaginary plane 24 (FIG. 2). An optical code reader head 26 is located at one of the corners and, as shown in FIG. 3, includes a light source 28, preferably a light-emitting diode, and a light sensor comprising one or more fiber optic filaments such as 30 and 32 operatively interacting with a phototransistor 34. The light source 28 communicates through a transparent plastic body 36 with the corner of the housing so as to illuminate an area immediately adjacent to and exterior of the corner, directing light in an oblique direction relative to the longitudinal directions of both of the respective edges 20 and 22 of the housing and generally parallel to the plane 24 defined by the edges of the housing. The fiber optic filaments 30 and 32 protrude outwardly from the housing through one or more slits cut in the plastic body 36, to an extent either flush with, or slightly recessed from, the outer tip of the body 36 so as to substantially physically contact the data codes and receive reflected light from such oblique direction. This placement and orientation of the code reader head 26 is effective in permitting the head to be placed in proper proximity to data codes even if they are in relatively inaccessible locations or surrounded by other structure which might otherwise cause interference with the edges of the planar housing of the code reader. As used herein, the term "generally parallel" to the imaginary plane 24 is used broadly to include directions within the plane 24 as well as directions which, although not parallel with the plane 24, are nearer to being parallel than perpendicular with respect to the plane.

Portable Code Reader and Charger Electronic Systems

Figure 4:
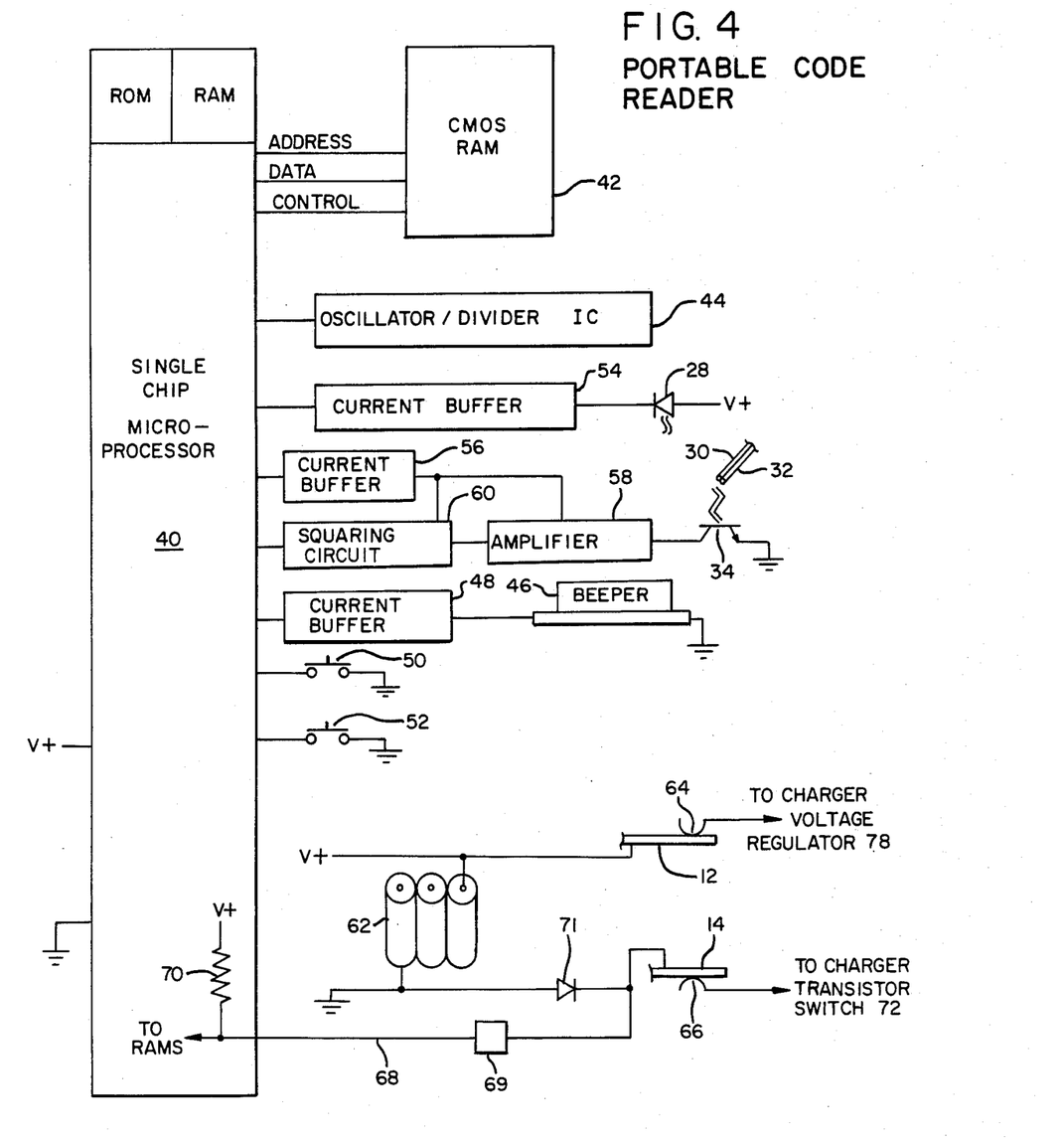
FIG. 4 is a simplified schematic diagram of the major operational components of the portable device of FIG. 1, shown connected to the battery charger receptacle.

FIG. 4 is a simplified diagram of the major electronic components contained within the thin, planar housing of the portable portion 10 of the code reader. The system contains a single chip microprocessor 40, such as an Intel or NEC model 80C49 microprocessor, consisting primarily of a read-only memory in which the device's preprogrammed routines are contained, and a small-capacity, random-access memory for temporary storage of inputs and outputs. The microprocessor 40 is coupled with a large-capacity, random-access memory 42 in which can be stored the data codes read by the device, as well as other information such as commands and user-supplied programming for varying the basic routines contained in the read-only memory. Other components include an oscillator/divider integrated circuit 44 which provides a clock reference, and an audible beeper 46 fed by a current buffer 48 and controlled by the microprocessor 40 to produce different audible outputs to indicate to the user such events as valid reception of an optical code, memory at or near capacity, unrecognizable commands or loss of power. A scan button 50 requires constant pressure to energize the major circuits of the portable device (other than the random-access memories and oscillator which are always energized) to preserve energy when the device is not in use. A reset button 52 is normally used only if the portable device has lost power, to return the circuits of the device to a known state. A light-emitting diode 28 is controlled through a current buffer 54 so as to act either as a light source for reading data codes, or as an optical serial output to transmit data codes stored in the memory 42. When the light-emitting diode 28 is used as a light source, the reflected light from the data codes is sensed through the optical fiber or fibers 30, 32 by the phototransistor 34 which reads the codes by means of conventional circuitry, fed by a current buffer 56, consisting of an amplifier 58 and squaring circuit 60 in conjuntion with a conventional decoding circuit in the microprocessor 40.

A principal novel feature of the system of FIG. 4 is that by which data other than optical data codes, such as commands and programming, are received by the portable unit 10. Rather than receiving such information optically through the phototransistor 34, such information is received electrically through separate circuitry which, for simplicity and economy, is integrated with the circuit for charging the batteries 62 of the portable unit 10. As shown in FIG. 4, the charging terminals of the portable unit consist simply of the upper and lower electrically-conductive plates 12 and 14 which, when placed in any one of several receptacles of a battery-charging unit whose components are shown in FIG. 5, contact the battery charger terminals 64 and 66, respectively. The portable unit 10 includes an input conductor 68, having a noise filter 69, connected to plate 14. When the unit 10 is not being charged, the input conductor 68 is maintained at a high electrical potential due to its exposure to the unit's voltage source through resistor 70 and its isolation from the unit's ground by diode 71. However, during charging of the batteries 62, the potential of conductor 68 is pulled low due to its exposure to ground through plate 14, charger terminal 66 and a charger power control transistor switch 72 (FIG. 5), which is normally maintained in a conducting state. Thus the portable unit 10 is able to sense, through its input conductor 68, whether or not it is being charged by whether the signal in conductor 68 is low or high.

With further reference to the battery charger system of FIG. 5, multiple pairs of charger contacts 64 and 66 (only two of such pairs being shown) are provided for contacting the plates 12 and 14 of respective portable code reader units 10 when the portable units are placed in the battery charger receptacles. In actuality, many more than two pairs of contacts 64 and 66 are provided, so that a substantial number of individual portable units 10 may be placed simultaneously in respective charging receptacles of the battery charger unit. The battery-charging function of the charger results from the supply of DC current obtained through a conventional AC adapter 74, jack and plug assembly 76 and voltage regulator 78 to the respective charging terminals 64 and 66 The supply of current to the charging terminals is regulated by the aforementioned transistor switch 72 so as to permit the supply of charging current only when the switch 72 is in its conducting state. The duty cycle of the transistor switch 72 is determined by coded, pulsed command or data signals supplied to the base of the transistor from the output of a conventional host computer connected to the charger by an input/output connector 80. The signals are transmitted to the base of the transistor switch 72 through a conductor 82 and voltage level converter 84 which converts output signal voltages of the host computer to levels usable to control the transistor switch 72. The charging current is thus pulsed by controlled switching of the transistor 72 to correspond to the coded pulsing of the output of the host computer. Such pulses are sensed by each individual portable unit 10 through its input conductor 68 for entry in its random-access memory.

In the absence of output from the host computer, the transistor switch 72 is maintained in its conducting state, whereas during such output the switch is in a conducting state on an average of approximately 50% of the time, thereby maintaining substantial charging current to the batteries 62 of the respective portable units in either case.

In the same charging receptacles which contain the charger terminals 64 and 66 are located phototransistors 86 (only two of which are shown) for receiving output light pulses from the light-emitting diodes 28 of the respective reader heads 26 of the portable code readers 10. Conventional circuitry including an amplifier 88 and voltage level converter 90, which converts the amplifier output voltage to a voltage level usable by the host computer, receives the data codes stored in each portable unit's memory and transmits them to the host computer through the connector 80. As an alternative to the optical outputs of the portable code readers, electrical outputs could be used instead, communicating through mating contacts on the portable units and in the charger receptacles, respectively.

Code Reader/Charger Interface Functions

Although charging of all portable code reader units in the charger can occur simultaneously, transmission of their respective ouputs to the host computer must occur sequentially. This will also normally be the case with respect to inputs of commands or programming to the individual portable code readers.

Figure 6:
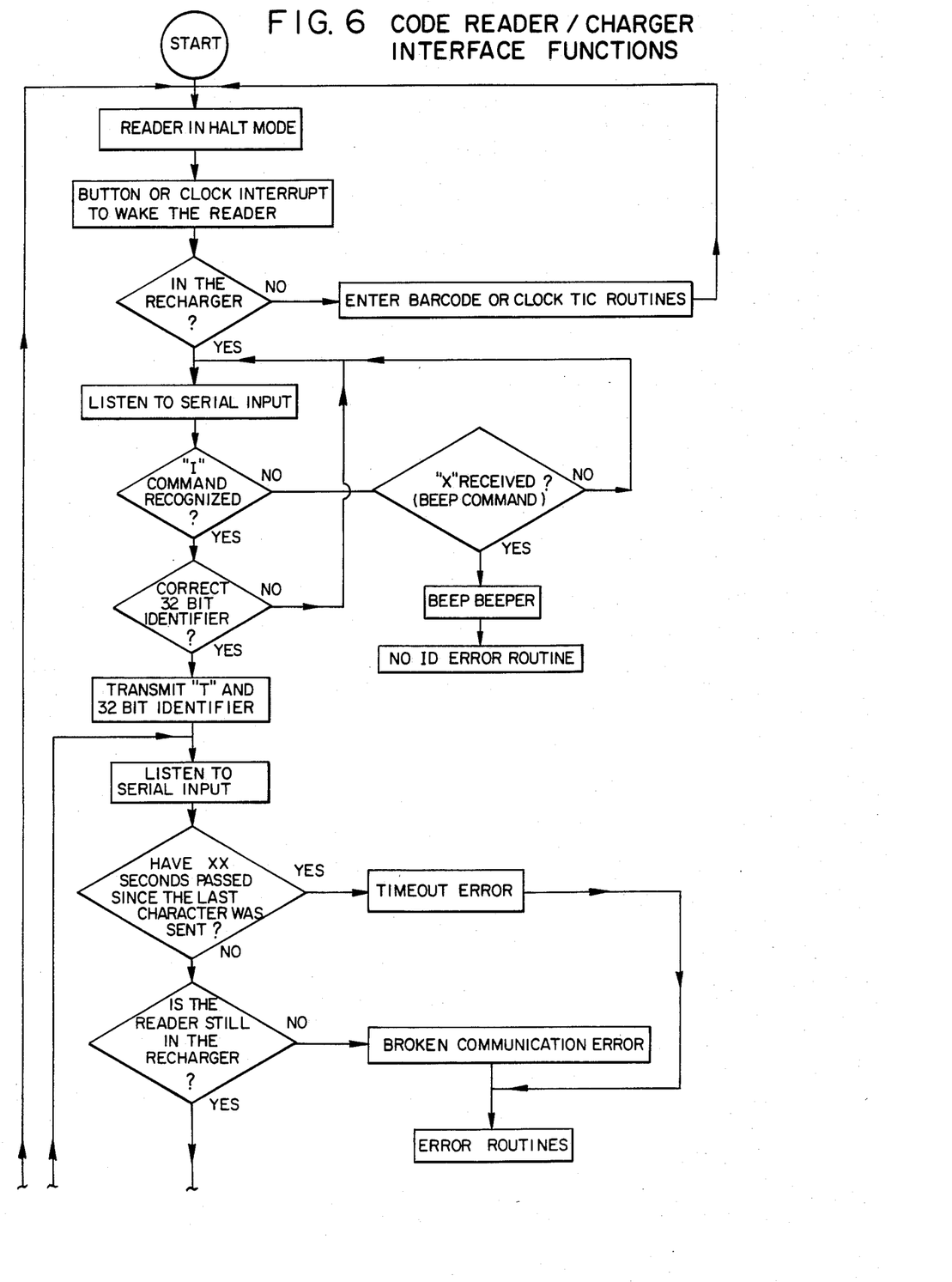
FIG. 6 is a logic flow diagram by which the code reader is programmed to interface, through the charger receptacle, with a host computer to transmit data codes stored in its memory and receive commands and programming.

To ensure proper sequential outputting and inputting with respect to each portable code reader, the read-only memory of each portable reader is preferably programmed to interact with the oharger and its oonnected host computer In accordance with the logic flow diagram of FIG. 6 (the host computer contains appropriate interactive programming). Since the button 50 of the portable code reader is not depressed when in the charger, it is normally in a halt, or de-energized, mode which is intermittently interrupted automatically by a signal from the oscillator 44 energizing it to monitor its environment, particularly to determine if it is in the battery charger. If it senses, by virtue of a low signal in its serial input conductor 68, that it is in the battery charger, it will remain energized to detect input signals through the conductor 68. The host computer, by its regulation of the duty cycle of transistor switch 72, will send first a general identification signal "I" which will be recognized by all portable readers in the charger of the type whose interaction with the host computer is intended. If one or more portable readers does not recognize the general identification signal, or if it has lost power, its beeper 46 will respond to a series of beep commands subsequently given by the host computer indicating that it should be removed from the charger. The host computer's beep commands are followed by a further identification signal unique to, and recognizable by, only a single particular code reader in the charger. In response to its recognition of this signal, the particular reader transmits a generalized "T" identifier (indicating that it is the type of unit whose interaction with the host computer is intended) followed by its own unique identification signal matching that transmitted earlier by the host computer. Thereafter the host computer transmits a further command, which may be either an output (read) command "R" or an input (write) command "W." If the command is a "R" (read) command, the host computer will have previously determined the address and length of the output data by scanning the code reader memory's directory, and the portable code reader will thus receive address information from the host computer indicating where in its memory the output data is to be found, and a data byte length count indicating the expected length of the output data required. In response, the code reader transmits a confirmation "S" of the "R" command, confirms the address and length information back to the host computer, transmits the data to the host computer, and transmits the actual length of the data as verification of the expected length, all by pulsing of its light-emitting diode 28. Alternatively, if the portable code reader receives a "W" (write) command from the host computer, it receives the address identifier, length count and data, places the data or programming into its random-access memory as specified by the address identifier, and transmits a responding confirmation "V" of the "W" command, address identifier, and length count, and verification that the actual length coincided with the expected length. These operations continue in rapid recycling fashion until the host computer discontinues its output or input commands and replaces them with a "G" command indicating the end of the inputting or outputting process, at which time the portable unit responds with a confirming "Q" command and reverts to its normal de-energized or "halt" mode.

If, in the course of an output or input transmission, an error in transmission occurs as indicated by the foregoing confirmation and verification procedures, the host computer retransmits the "R" or "W" command, as the case may be, requesting the portable unit to transmit or receive once again the invalid transmission. If an error continues to occur, the host computer transmits a "Z" (reset) command in which case the portable unit answers with a confirming response and reinitializes itself.

While all of the foregoing is occurring with respect to one particular portable code reader located in a charger receptacle, the other readers located in other receptacles of the same charger are being charged by the pulsed charging current, but are not otherwise interacting with the host computer signals because of their nonrecognition of the original unique identification signal. (Alternatively, multiple portable units could be programmed to recognize the same unique identification signal for input purposes, if identical programming of all such units is intended.)

After the host computer has completed its interaction with one portable unit it changes its unique identification signal and begins interacting with another of the portable units in the manner just described. In this fashion it sequentially interacts with each of the portable units automatically, without the need for any supervision, obtaining outputs and, if necessary, providing programming inputs to the respective portable units.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An optical sensing device for reading data codes, comprising a thin, generally planar housing of polygonal shape having multiple elongate edges joined at angled corners of said housing, said elongate edges extending longitudinally in multiple directions in the same plane, said housing having means mounted thereon for reading said data codes including light source means communicating with one of said corners of said housing for directing light in an oblique direction relative to the longitudinal directions of the respective edges of said housing joined at said one of said corners, for illuminating an area immediately adjacent to and exterior of said one of said corners, and light sensor means communicating with said one of said corners for receiving light reflected from said area.

2. The optical sensing device of claim 1 wherein said oblique direction is other than perpendicular to said plane.

3. The optical sensing device of claim 1 wherein said oblique direction is generally parallel to said plane.

4. The optical sensing device of claim 3 wherein said light sensor means comprises an optical fiber, protruding outwardly from said housing in said oblique direction at said one of said corners, for substantially contacting said data codes.

5. An optical sensing device for reading data codes, comprising a thin, generally planar housing having an elongate edge surface extending longitudinally along the periphery thereof in multiple directions in the same plane, said housing having means mounted thereon for reading said data codes including light source means communicating with a location on said edge surface for directing light in an illuminating direction generally parallel to said plane, for illuminating an area immediately adjacent to and exterior of said location on said edge surface, and light sensor means communicating with said location on said edge surface for receiving light reflected from said area, said light sensor means including optical fiber means, protruding outwardly from said housing in said illuminating direction at said location on said edge surface, for contacting said data codes.

6. An optical sensing device for reading data codes, comprising light source means for illuminating said data codes and light sensor means for receiving light reflected from said codes and thereby reading said codes, memory means for storing the data codes read by said light sensor means and for storing other information in addition to said data codes, a portable housing for enclosing said light source means, light sensor means and memory means, and electrical circuit means operatively connected with said memory means for receiving said other information electrically from an electrical source exterior of said housing independently of said light sensor means by detachable connection of said electrical circuit means to said electrical source, and transmitting it to said memory means for storage in said memory means.

7. The optical sensing device of claim 6 wherein said electrical circuit means includes means for receiving coded commands and for accessing said data codes stored in said memory means in response to said commands.

8. The optical sensing device of claim 6 wherein said electrical circuit means includes means for receiving changes to said other information stored in said memory means and transmitting said changes to said memory means.

9. The optical sensing device of claim 6 including further electrical circuit means for transmitting said data codes stored in said memory means.

10. The optical sensing device of claim 9, further including receptacle means, for detachably engaging said housing and operatively interacting with both of said electrical circuit means, for transmitting said other information to said memory means and receiving said data codes stored in said memory means.

11. The optical sensing device of claim 6, further including chargeable battery means for energizing said optical sensing device and electrical contact means for receiving electrical energy to charge said battery means, said electrical circuit means including means connected to said electrical contact means for sensing said electrical energy to charge said battery means and receiving said other information in response thereto.

12. The optical sensing device of claim 4, further including battery-charging means detachably connectable to said electrical contact means, said battery-charging means including means for delivering said electrical energy to charge said battery means by pulsing of said electrical energy in a coded manner corresponding to said other information.

13. An optical sensing device for reading data codes, comprising light source means for illuminating said data codes and light sensor means for receiving light reflected from said codes and thereby reading said codes, memory means for storing the data codes read by said light sensor means and for storing other information in addition to said data codes, first electrical circuit means operatively connected with said memory means for receiving said other information and second electrical circuit means operatively connected with said memory means for transmitting said data codes stored in said memory means, a portable housing for enclosing said light source means, light sensor means, memory means and first and second electrical circuit means, and receptacle means, for detachably engaging said housing, including first means for transmitting said other information to said memory means for storage therein through said first electrical circuit means and second means for receiving said data codes stored in said memory means through said second electrical circuit means, said first means interacting with said first electrical circuit means independently of said light sensor means.

14. The optical sensing device of claim 13, including chargeable battery means for energizing said optical sensing device, said receptacle means including battery-charging means detachably connectable to said battery means for delivering electrical energy to charge said battery means.

15. The optical sensing device of claim 14, said battery-charging means including means for delivering said electrical energy to charge said battery means by pulsing of said electrical energy in a coded manner corresponding to said other information, said first electrical circuit means including means for sensing the pulses of said electrical energy delivered by said battery-charging means.

16. An optical sensing device for reading data codes, comprising light source means for illuminating said data codes and light sensor means for receiving light reflected from said data codes and thereby reading said codes, memory means for storing the data codes read by said light sensor means, electrical circuit means for transmitting said data codes stored in said memory means, battery means for energizing said optical sensing device and battery-charging means detachably operatively connectable to said battery means for charging said battery means, said battery-charging means including receiver means for receiving said data codes stored in said memory means through said electrical circuit means, said electrical circuit means including means for sensing the operative connection of said battery-charging means to said battery means for transmitting said data codes stored in said memory means to said receiver means in response to the operative connection of said battery-charging means to said battery means.

17. The optical sensing device of claim 16, further including means for automatically periodically energizing said electrical circuit means for enabling it to sense the operative connection of said battery-charging means to said battery means.

18. An optical sensing device for reading data codes, comprising light source means for illuminating said data codes and light sensor means for receiving light reflected from said codes and thereby reading said codes, memory means for storing the data codes read by said light sensor means and for storing other information in addition to said data codes, electrical circuit means operatively connected with said memory means for receiving said other information, and receptacle means for detachably operatively interacting with said electrical circuit means for transmitting said other information to said memory means through said electrical circuit means, said optical sensing device further including chargeable battery means for energizing said optical sensing device and said receptacle means including battery-charging means detachably connectable to said battery means for delivering electrical energy to charge said battery means, said battery-charging means including means for delivering said electrical energy to charge said battery means by pulsing of said electrical energy in a coded manner corresponding to said other information, said electrical circuit means including means for sensing the pulses of said electrical energy delivered by said battery-charging means.

19. A multiplicity of optical sensing devices for reading data codes, each such device comprising light source means for illuminating said data codes and light sensor means for receiving light reflected from said data codes and thereby reading said codes, memory means for storing the data codes read by said light sensor means, and electrical circuit means for receiving coded commands and transmitting said data codes stored in said memory means in response to said commands, further including multiple receptacle means for detachably engaging said multiplicity of optical sensing devices simultaneously and operatively interacting with respective ones of said electrical circuit means for receiving data codes stored in each of said memory means, said multiple receptacle means including means for transmitting different coded commands sequentially to each of said electrical circuit means, each of said electrical circuit means including means responsive to a different one of said coded commands for transmitting data codes stored in its associated memory means in response to said one of said coded commands.

* * * * *

UNITED STATES PATENT AND TRADEMARK OFFICE
CERTIFICATE OF CORRECTION

PATENT NO. : 4,721,849

DATED : January 26, 1988

INVENTOR(S) : Paul R. Davis, et al.

It is certified that error appears in the above-identified patent and that said Letters Patent is hereby corrected as shown below:

| | |
|---|---|
| Col. 1, line 65 | Change "AccordingIy" to --Accordingly-- |
| Col. 5, line 37 | Change "pIaced" to --placed-- |
| Col. 5, line 38 | Change "oharger" to --charger-- |
| Col. 5, line 46 | Change "66" to --66.-- |
| Col. 6, line 30 | Change "oharger" to --charger-- |
| Col. 6, line 31 | Change "In" to --in-- |

Signed and Sealed this

Sixteenth Day of May, 1989

Attest:

DONALD J. QUIGG

Attesting Officer

Commissioner of Patents and Trademarks